(12) United States Patent
Locke et al.

(10) Patent No.: US 8,168,299 B1
(45) Date of Patent: May 1, 2012

(54) POLYMERIC COATING AND LINING SYSTEM

(75) Inventors: Ralph J. Locke, Fort Myers, FL (US); Dudley J. Primeau, II, Elgin, TX (US)

(73) Assignee: DCT Holdings, LLC, Bingham Farms, MA (US)

( * ) Notice: Subject to any disclaimer, the term of this patent is extended or adjusted under 35 U.S.C. 154(b) by 1020 days.

(21) Appl. No.: 12/042,646

(22) Filed: Mar. 5, 2008

(51) Int. Cl.
*B32B 27/40* (2006.01)
*C08G 18/00* (2006.01)

(52) U.S. Cl. .......................... 428/423.1; 528/44; 528/68

(58) Field of Classification Search .............. 528/68, 528/44; 428/423.1
See application file for complete search history.

(56) References Cited

U.S. PATENT DOCUMENTS

| | | | |
|---|---|---|---|
| 5,118,728 A * | 6/1992 | Primeaux | 523/315 |
| 5,162,388 A | 11/1992 | Primeaux, II | |
| 5,312,886 A | 5/1994 | House et al. | |
| 5,442,034 A | 8/1995 | Primeaux, II | |
| 5,480,955 A | 1/1996 | Primeaux, II | |
| 5,504,181 A | 4/1996 | Primeaux, II | |
| 5,554,686 A * | 9/1996 | Frisch et al. | 524/588 |
| 5,616,677 A | 4/1997 | Primeaux, II | |
| 5,814,398 A | 9/1998 | Kronz et al. | |
| 6,013,755 A | 1/2000 | Primeaux, II et al. | |
| 6,291,019 B1 * | 9/2001 | Locke et al. | 427/385.5 |
| 6,423,425 B1 * | 7/2002 | Faucher et al. | 428/626 |
| 6,613,389 B2 * | 9/2003 | Li et al. | 427/388.1 |

* cited by examiner

*Primary Examiner* — Thao T. Tran
(74) *Attorney, Agent, or Firm* — Young Basile (57) ABSTRACT

An automotive vehicle having at least one vehicular exterior surface formed from at least a portion of an exterior pickup box. The vehicular exterior surface includes a structural substrate having an outwardly oriented surface and at least one polymeric layer in overlying relationship to at least a portion of the outwardly oriented surface of the structural substrate. The polymeric layer contains at least one polymeric material formed from the reaction of at least one isocyanate with at least one resin component, the resin component comprising at least one catalyst free aliphatic amine.

21 Claims, 1 Drawing Sheet

POLYMERIC COATING AND LINING SYSTEM

BACKGROUND

This disclosure pertains to polymeric automotive bed liners and the like. The present disclosure pertains to polymeric bed liners that are composed of a catalyst free 100% aliphatic polyurea material system. The present disclosure also pertains to methods for applying 100% aliphatic polyurea material systems to suitable surfaces. The present disclosure also pertains to plural component 100% aliphatic polyurea systems capable of use as an exterior automotive finish.

Multi-component polyurea spray elastomer technology has been employed in the coatings and lining industry. Heretofore such spray coatings have employed aromatic polyurea compounds and components in order to ensure good application performance. Aromatic polyurea spray systems are not without challenges though. Aromatic spray elastomer systems present problems in applications that encounter prolonged or elevated UV exposure and/or elevated humidity conditions. Such systems exhibit color instability and chalking upon prolonged exposure to sunlight and particularly to UV radiation. Furthermore, the application of aromatic polyurea material systems is problematic in high speed assembly processes for a variety of reasons including, but not limited to challenges inherent in the aromatic chemistries and specifics of the reaction process of the various aromatic polyurea components including gel time, cure rate and mix ratio tolerance.

Various alternatives have been proposed to address and/or minimize the deleterious effects from UV exposure and the like. One set of alternatives has been to include small amounts of aliphatic polyureas/polyurethanes in order to produce hybrid systems in an effort to address issues such as color stability and chalking. However, these systems are not generally suitable for Class A automotive surfaces.

Various aromatic-based polyurea systems, as well as polyurethane/polyurea hybrid systems and polyurethane systems have been used in after-market automotive bedliner type applications. While these systems do perform with acceptable results for the after market, they are not to the standards required of OEM/in-plant applications.

SUMMARY

Disclosed herein is a formulation composed of a plural-component aliphatic polyurea material suitable for uses including but not limited to an automotive bed liner in regions of an automobile such as the areas of a pick up truck typically referred to as the pickup box inner. The aliphatic polyurea composition employed is a polyurea elastomer having linkages formed from the reaction of active amine hydrogen groups with isocyanates in which at least 75% of the hydrogen groups are present as amine compounds. The system is one that is essentially free of catalyst material. Also disclosed is a vehicle that includes at least one exterior region coated with at least one plural component aliphatic polyurea composition. The polyurea material disclosed herein can be applied to the vehicle surface by any suitable method including, but not limited to high speed, robotic spray application.

DESCRIPTION

Disclosed herein is a formulation suitable for use in applications including but not limited to use as a vehicular bed liner that includes at least one polyurea elastomer formed from a plural-component aliphatic sprayable polymeric urea system. The plural component aliphatic sprayable polymeric urea system employed herein comprises urea linkages formed by the reaction of active amine hydrogen groups with isocyanate compounds. Also disclosed herein is a bed liner affixed to at least a portion of a vehicular bed surface composed of the aforementioned material. The bed liner disclosed herein includes at least one layer that is composed of at least one polyurea elastomer that comprises urea linkages formed by the reaction of active amine hydrogen groups with isocyanates. It is also contemplated that the plural-component aliphatic sprayable polymeric urea system can be utilized for certain other automotive exterior finishes including certain regions such as running boards.

The plural component aliphatic sprayable polymeric urea system includes an aliphatic polyurea elastomeric material. The polyurea elastomeric material employed will be one that is formed from reaction mixtures having at least about 75 percent of the active hydrogen groups in the form of amine groups. Preferably, the reaction mixtures have at least about 85 percent of the active hydrogen groups in the form of amine groups, and even more preferably, the reaction mixtures have at least 95 percent of the active hydrogen groups in the form of amine groups.

It is contemplated that the polyurea elastomeric material will be a 100% aliphatic polyurea material. The term "100% aliphatic polyurea elastomeric material" as used herein, is contemplated to include and encompass trace amounts of hydroxyl compounds such as those that may inadvertently be introduced in one or more of the various reaction precursors.

The pick-up trucks contemplated herein include light passenger vehicle pick-up trucks, heavy passenger vehicle pick-up trucks as well as other heavier duty vehicles, with a particular emphasis on various passenger vehicle configurations. In particular applications, the bed liner material and configuration can be that typically found in open bed truck configurations. The material disclosed herein can be employed advantageously as a spray applied elastomeric film for use on exterior pickup box inner tubs, particularly where low gloss texture appearance, high flexibility, high durability and impact resistance are required.

The material disclosed herein is capable of providing a Class A exterior automotive finish with UV durability in excess of 2 years Florida exposure as well as meeting typical automotive OEM requirements for adhesion, humidity resistance, chemical resistance, elongation, tensile strength, flexibility, durability and impact resistance suitable for use as a truck bed liner, vehicular running boards, and the like. Also disclosed herein, is a vehicular bed liner having a plural component spray elastomeric film overlying at least a portion of a vehicular bed. As used herein, the term "vehicular bed liner" is construed as an applied coating or material that adheres to at least a portion of the bed region of a suitable automotive vehicle. The beds contemplated in this disclosure include, but need not be limited to, the containers typically found in various pick-up trucks and the like as well as a method for applying the spray applied elastomeric film. Vehicular running boards can also be prepared having a plural-component 100% aliphatic sprayable polyurea system overlying at least a portion of a surface thereof.

Also disclosed herein is a method for applying a vehicular bed liner to a truck bed. It is contemplated that the plural component aliphatic polyurea spray elastomer system can be applied in various high speed automotive production line configurations. The system disclosed herein can be applied with minimal preparation to the bed system of a truck. It is contemplated that the material can be applied directly to any substrate material or can overlay various finishes such as those that are generally known for use as automotive finishes. The plural component aliphatic sprayable polymeric urea system can be applied using high pressure, high temperature impingement mix spray equipment and a suitable volume ratio. In many embodiments, the plural component aliphatic sprayable polymeric urea system will be applied at an engineered volume ratio of 1:1. The plural component aliphatic sprayable polymeric urea system disclosed herein is particularly amenable to high speed robotic application. Without being bound to any theory, the unique chemistry of the system contributes to the high speed application processes and provides a material that affords a mix ratio tolerance to perform to stated requirements if off ratio by as much as 15% on either side.

It is contemplated that the 100% aliphatic polyurea system can be composed of two components: A) an aliphatic isocyanate quasi-prepolymer of an aliphatic isocyanate monomer and an amine terminated polyether resin (polyurea quasi-prepolymer); and B) a resin blend component that comprises at least one of high molecular weight amine-terminated polyethers, polyether amines, and blends containing the aforementioned. It is contemplated that the resin component can also include one or more of various materials that can function as chain extenders, pigments, flame retardants and optional performance additives as desired or required.

More specifically, the aliphatic polyurea spray elastomer system can be formulated by first preparing each of the two components of the system. Where desired or required, the isocyanate component can be prepared by forming a suitable quasi-prepolymer. One non-limiting example of a suitable quasi-prepolymer is one prepared from the reaction of a suitable diisocyanate with a suitable polymeric diamine.

Non-limiting examples of suitable aliphatic isocyanates can include the aliphatic isocyanates of the type described in U.S. Pat. No. 5,162,388, which is incorporated herein by reference. Accordingly, these are typically aliphatic diisocyanates and, more particularly, are the bifunctional monomers of the tetraalkyl xylene diisocyanate, such as the tetramethyl xylene diisocyanate, or the trimerized or the biuret form of an aliphatic diisocyanate, such as hexamethylene diisocyanate. Also, cyclohexane diisocyanate and isophorone diisocyanate can be considered useful aliphatic isocyanates. In certain embodiments, it is believed that materials such as cyclohexane diisocyanate and/or isophorone diisocyanate can be effectively employed. One suitable diisocynate would be an isophorone diisocyanate. It is to be understood that the aforementioned isocyanates may be used alone or in combination.

The diisocyanate material can be reacted with a suitable polyether based diamine and/or triamine. It is contemplated that a diamine/triamine material having molecular weights between about 1000 and about 5000 can be employed with a molecular weight of approximately 2000 being preferred in many applications. Suitable amine-terminated polyether compounds include, but are not limited to, various 2000 molecular weight polyoxylalkylene diamine.

The degree of reaction between the two compounds in the quasi prepolymer can be adjusted to provide a suitable excess of isocyanate equivalents in the quasi-prepolymer. Generally the degree of reaction can be measured or adjusted to be 12% to 16% defined by % of un-reacted isocyanate equivalent.

Where desired or required, the quasi prepolymer can include suitable additives and modifiers. The additives and/or modifiers can be those suitable for affecting reaction rate or time and/or for modifying physical and/or chemical characteristics of the resulting quasi prepolymer. The additive(s) can be present in any amount suitable to achieve the desired modification.

In certain embodiments of the composition disclosed herein, a small amount of a suitable alkylene carbonate can be added to the quasi prepolymer. Without being bound to any theory, it is believed that the suitable alkylene carbonate can function as an additive to modify composition viscosity and/or mixing characteristics. The alkylene carbonate component can be at least one of alkylene carbonates selected from the group consisting of ethylene carbonates, propylene carbonates, butylene carbonates, dimethyl carbonates, and mixtures thereof. The alkylene carbonate can be present in an amount suitable to impart viscosity modification and/or enhanced mixing characteristics. In certain embodiments it is contemplated that the alkylene carbonate can be present in an amount between 5-8% by weight with materials such as propylene carbonate being added to the prepared quasi-prepolymer to aid in component viscosity reduction and improved mixing in the spray application with the other component(s) of the system. Other non-limiting examples of additives would include other carbonates and oxazolidines. Non-limiting examples of suitable alkylene carbonates include those commercially available from Huntsman Chemical under the trade name JEFFSOL.

The other component is a resin blend. The resin blend will generally include at least two amine components and may include various additives as desired or required. The amine components can include various aliphatic diamines and triamines. The aliphatic diamines and triamines can have a suitable molecular weight, generally between about 200 and about 5000. Suitable materials include, but are not limited to, various amine-terminated polyethers.

Various non-limiting examples of suitable aliphatic diamines include high molecular weight amine-terminated polyethers or simple polyether amines. It is also contemplated that various other amine-terminated compounds can be employed. These amine terminated compounds can be formed from the base polyols selected from the group consisting of polyoxypropylene diols, polyoxypropylene triols, polyester polyols, and various multifunctional polyether polyols, including but not limited to di-, tri-, quad-, and penta-functionalities, polyether polyols and various multifunctional polyether polyols including but not limited to di-, tri-, quad-, and penta functionalities, and mixtures thereof can be employed. Polybutadiene-based amine-terminated compounds may also be employed.

The active amine hydrogen-containing materials useful in the present disclosure may be chosen from amine-terminated polyethers. Preferably the amine-terminated polyethers are selected from aminated diols or triols and, more preferably, may include a blend of aminated diols and/or triols. More preferably, the amine-terminated polyethers are selected from mixtures of high molecular weight polyols; such as mixtures of di- and trifunctional materials. However, a single high molecular weight aminated polyol can be used. It is to be understood that high molecular weight amine-terminated alkylenes and simple alkyl amines are also included within the scope of this disclosure, and may be used alone or in combination with the aforementioned amine-terminated polyols. In addition, other amine-terminated materials having different molecular weights or different chemical compositions may be used. The amine-terminated polyether resins useful in this disclosure have greater than about 95 percent of their active hydrogens in the form of amine hydrogens.

It is to be understood that many high molecular weight amine-terminated polyethers or simple polyether amines may be used as the polymer and/or part of the polymer blend in the resin component of the composition disclosed herein. In certain embodiments the amine-terminated material can be a polyetheramine characterized as a difunctional, primary amine in which the primary amine groups are located on secondary carbon atoms at the end of aliphatic polyether chains.

Suitable materials include JEFFAMINE® brand series of polyether amines available from Huntsman Petrochemical Corporation in Houston, Tex. This series includes JEFFAMINE® D-2000 (an amine-terminated polyoxypropylene diol of 2000 molecular weight), JEFFAMINE® D-4000 (an amine-terminated polyoxypropylene diol of 4000 molecular weight), JEFFAMINE® T-3000 (an amine-terminated polyoxypropylene triol of 3000 molecular weight) JEFFAMINE® T-5000 (an amine-terminated polyoxypropylene triol of 5000 molecular weight), JEFFAMINE® T-403 (an amine-terminated polyoxypropylene triol of 400 molecular weight), and JEFFAMINE® D-230 (an amine-terminated polyoxypropylene diol of 230 molecular weight). These polyetheramines are described with particularity in Huntsman Corporation's product brochure entitled "The JEFFAMINE® Polyoxyalkyleneamines." The JEFFAMINES are amine-terminated polyoxypropylenes, the "D" designates a diamine, the "T" designates a triamine, and the number extension designates the molecular weight.

In certain embodiments, it is contemplated that the amine component is prepared by mixing a polyoxylalkylene diamine (JEFFAMINE D-2000), a polyoxyalkylene triamine (JEFFAMINE T-5000) in a material-to-material ratio between about 4:1 and about 5:1.

The polymeric components of the resin component of the composition disclosed herein may be present in any amount sufficient to achieve desired degrees of the characteristics including, but not limited to toughness, durability and UV stability. These compounds contribute to the amount of cross link density imparted to the composition, as well as to the amount of rigidity or softness imparted to the composition. In various embodiments, it is contemplated that these compounds can comprise between about 50 wt % and about 70 wt. % of the resin component of the composition. In certain specific embodiments, it is contemplated that the polymer or a blend of the polymers may be present in an amount ranging between 50 wt % and 60 wt % of the resin component of the composition.

The resin component can also include additional components as desired or required. Non-limiting examples of such additional components include adhesion promoters, pigments, stabilizers, flame retardants and the like. Such additives may be present in any suitable amount. It is contemplated that the total additive amount will not exceed 10% wt of the resin component.

Where employed, it is contemplated that the chain extender component can be present as an individual component or as a blend of components present in an amount sufficient to impart a predetermined amount of tensile strength, weatherability, flexibility, adhesion to specific substrates, and hardness to the overall system. Where employed, the chain extender component can be present in an amount between 30 and 45 pbw of the resin component, with amounts between 30 and 40 pbw being present in certain applications. Without being bound to any theory, it is believed that the chain extender(s) may also adjust the reaction rates of the overall system. Amine-terminated chain extenders can be characterized as diamines that are either primary or secondary in nature.

Non-limiting examples of suitable chain extenders include cycloaliphatic diamine chain extenders such as isophorone diamines. Non-limiting examples of such materials include various cyclic or linear molecules such as VESTAMIN IPD, an isophorone diamine (commercially available from Evolink), POLYCLEAR 136, acrylonitrile-modified isophorone diamine (commercially available from BASF Corporation), and JEFFLINK 754 (acetone modified isophorone diamine) from Huntsman Corporation. It is also contemplated to employ substituted, secondary cycloaliphatic diamine chain extenders in the composition instead of or in combination with unsubstituted diamine chain extenders. Non-limiting examples of such materials include materials like CLEARLINK 1000 (cyclohexaneamine, 4,4'-methylenebis(N-(1-methylpropyl)) available from UOP Corporation and SD-10 (N,N'-di(3,3-dimethyl-2-butyl)-1,6 diaminohexane)) from Albemarle Corporation. Without being bound to any theory, it is believed that materials such as secondary cycloaliphatic diamines contribute to system reactivity control.

It is also contemplated that the additives can include suitable pigments, colorants and the like with inorganic pigments, such as titanium dioxide or carbon black being two non-limiting examples. Pigments may also include organic based compounds as well as various other inorganic materials as can be carried in either polymeric precursors and/or a 100% aliphatic polyurea material during application. However, where desired or required, the material can be formulated without colorants or pigments to provide a nonpigmented material. It is contemplated that such material may be clear or essentially clear when applied.

Where desired or required, the resin composition can also include various adhesion promoters. The adhesion promoter additive can be present in the resin composition as an individual adhesion promoter compound or a combination of adhesion promoters as desired or required. These additives may be used to promote the adhesion of the disclosed spray system to a specific type of substrate. Such substrates include the vehicular substrate as well as layer to layer adhesion.

It is contemplated that, in certain situations, adhesion characteristics of the composition can be improved by the addition of between about 0.01 pbw and about 0.25 pbw of a suitable adhesion promoter additive. Non-limiting examples of suitable adhesion promoters include various organosilane compounds. In various embodiments, it is contemplated that the adhesion promoter can be between about 0.05 pbw and about 0.25 pbw of an organosilane compound in the resin component with certain embodiments having an adhesion promoter present in amounts between about 0.01 pbw and about 0.15 pbw.

It is contemplated that epoxy silane compounds can be employed effectively in various formulations disclosed herein. One non-limiting example of a suitable adhesion promoting material is commercially available under the trade name A-187 SILANE from OSi Specialties, Inc. in Danbury, Conn. It is believed that such materials are gamma-glycidoxypropyl-trimethoxysilane (CAS 2530-83-8). Other non-limiting examples of suitable adhesion promoters include amino alkoxy silanes and vinyl alkoxy silanes, such as those described in U.S. Pat. No. 5,731,397, which is incorporated herein by reference. Additional non-limiting examples of adhesion promoters include chlorinated polyolefins and polyester based resins. Non-limiting examples of chlorinated polyolefins include materials commercially available from Eastman Chemical under the trade name of Eastman CP series. Non-limiting examples of polyester based resins include materials commercially available from King Industries under the trade name of K-Flex.

Where desired or required, the resin compositions can also include various other additives including, but not limited to, moisture scavengers, UV stabilizers and antioxidants. In at least one embodiment, it is contemplated that the resin component may contain at least one suitable inorganic moisture scavenger and/or a suitable UV stabilizer. Non-limiting examples of suitable UV stabilizers including but not limited to various polymethyl methacrylates and/or antioxidants included materials. Suitable UV stabilizer materials are commercially available under the trade names such as TINUVIN and IRGANOX from CIBA with materials such as TINUVIN 765 being a non-limiting example. Non-limiting examples of antioxidants include materials commercially available from CIBA under the trade name IRGANOX.

Non-limiting examples of other suitable additives include fillers such as molecular sieves such as zeolites or zeolite containing castor oil, and fumed silica. Without being bound to any theory, it is believed that zeolites and zeolite-containing castor oils can assist in viscosity control of the liquid polyurea, aid in leveling the resulting coating, and may act as moisture absorbers. (See, e.g., U.S. Pat. No. 4,567,230 regarding molecular sieve moisture absorbers which is herein incorporated by reference). It is believed that the moisture (if any) does not come from the resin, but rather from the underlying surface and from the atmosphere. In many situations, it is contemplated that the demoisturizing fillers can, however, be omitted, with acceptable results. One non-limiting example of a suitable filler is BAYLITH L Paste commercially available from Bayer.

Where any of the aforementioned additives are employed it is contemplated that the various additives will be present in an amount sufficient to impart the desired characteristics. The total content of the other additives will typically be between about 5% and about 12% of the resin component.

It is contemplated that the various resin components can be blended together in a suitable concentration depending on the reactive equivalents of the systems such that the final mix ratio of the resin component and the isocyanate quasi prepolymer of the plural component aliphatic sprayable polymeric urea system is 1:1 by volume. It is contemplated that the ratio can vary by approximately 15% without significant adverse effects.

It is contemplated that the ratio of equivalents of isocyanate groups in the polyisocyanate to the active hydrogens in the various resin and isocyante components is in the range of 0.95:1 to about 2.00:1. In certain embodiments, the ratio can be present in a range between about 1.00:1 to about 1.50:1 while in certain specific embodiments, the ratio can be between about 1.05:1 to about 1.30:1. It is contemplated that, in various embodiments, the active hydrogens are present in significant quantities as amine hydrogens. This ratio is sometimes referred to as the isocyanate INDEX and is expressed as a percentage of excess isocyanate. The isocyanate INDEX compares the total isocyanate with the total active hydrogen in the reactant compounds.

The plural component aliphatic sprayable polymeric urea system as disclosed herein will have defined characteristics in the liquid state as defined, in the following table.

| ISOCYANATE PHYSICAL CHARACTERISTICS (LIQUID) | | |
|---|---|---|
| Physical Characteristic | Value | Test Method |
| Weight by volume | 1.10 ± 0.05 kg/L | ASTM D 816 |
| Viscosity (typical range) | 1800 to 2300 cps | Brookfield viscosity ASTM D 1824 |
| Volatile Organic Compound | 0.0 kg/L | EPA reference Method 24 |

| RESIN PHYSICAL CHARACTERISTICS (LIQUID) | | |
|---|---|---|
| Physical Characteristic | Value | Test Method |
| Weight by volume | 1.00 ± 0.05 kg/L | ASTM D 816 |
| Viscosity (typical range) | 1000 to 1500 cps | Brookfield viscosity ASTM D 1824 |
| Volatile Organic Compound | 0.35 kg/L | EPA reference Method 24 |

The resulting material is a plural component system that can be applied to the substrate in any suitable manner. Broadly construed, it is contemplated that the method comprises the steps of admixing an isocyanate quasi prepolymer as disclosed herein with a resin component as disclosed herein to form a plural component system; dispatching the plural component system at elevated temperature and high pressure; and applying the plural component system onto at least a portion of a truck bed and/or other automotive surface.

The plural component system is preferably applied at high pressure and elevated temperature using suitable spray equipment. In many applications, it is contemplated that the spray applicator will be a two-component system. In general, it is contemplated that elevated dynamic pressure in a range between 1700 psi and 2500 psi can be successfully utilized. It is also contemplated that the applicator will be one that utilizes elevated temperature in at least a portion of the mixing and/or application process. It is contemplated that material can be mixed and applied at an elevated temperature in a range between 140 degrees F. and 160 degrees F. The material is uniquely formulated for robotic application and impingement mix dispensing where mix ratio tolerance is required.

The resulting plural component material can be applied to the associated truck bed structure in a manner that provides a final layer thickness between 25 mils and 100 mils. It is contemplated that the material layer thickness can be essentially consistent throughout the layer. However where desired or required, the layer thickness can be varied over the coverage area, for example, in order to accommodate excessive wear areas and/or irregularities in the underlying surface area. It is also contemplated that the thickness of the applied material can be varied based on the specific region of the truck bed. For example, it is contemplated that the thickness of the applied material can be less on sidewalls of the truck bed than on the bottom.

The bed liner system disclosed herein can be applied by any suitable method. The method chosen will typically provide for reactive admixture of the various components at a point in the application process suitable for promoting liquid or semi-liquid administration of the polymeric material to the surface of the substrate with additional solidification of the applied material occurring after contact with the substrate. It is contemplated that solidification can include physical solidification as the temperature of the applied material drops after application. However, in many instances, it is contemplated that the chemical cross linking will commence with the contact between the various components with the cross linking reaction(s) proceeding to a point prior to application that will still facilitate application and adhesion to the substrate surface with the cross-linking reaction continuing post application.

The dual component material can be processed in any manner suitable to provide and promote the reactive admixture and application of the resulting material. Thus, where desired or required, the materials can be processed at elevated pressure and/or temperature. As used herein, the terms "elevated temperature" and "elevated pressure" are defined as values above standard temperature and pressure (STP). In certain situations, it is contemplated that one or both values will be above ambient. The temperature and/or pressure elevation can be that necessary to achieve reactive admixture and maintain the material in a suitable state for application. It is contemplated that elevated temperature will be at least 25° C. above standard temperature with an upper temperature elevation being limited to the decomposition temperature of one or more of the component materials. In certain applications, temperature elevation will be at least 35° C. above standard. It is also contemplated that one or more of the component process streams can be preheated prior to reactive admixture. The preheat temperature for a given component can be affected for a variety of factors including, but not limited to, altering physical characteristics of the component stream, non-limiting examples of which include viscosity. It is also contemplated that the temperature of a given component stream can be elevated to enhance or promote the reaction upon admixture with one or more additional components or component streams. Introduction temperatures for one or more of the component streams can be at least 25° C. above standard, with temperature elevations of at least 35° C. being contemplated in certain embodiments.

It is contemplated that in such dual component systems, the (A) component and the (B) component of the aliphatic polyurea spray bedliner system are combined or mixed under high pressure; most preferably, they are impingement mixed directly in the high-pressure spray equipment. Non-limiting examples of suitable spray mixing equipment include various units available under the following trade names: GUSMER H-2000, GUSMER H-3500, GUSMER H-2035, and Glas-Craft MH type proportioning units. It is contemplated that such units can be fitted with suitable applicators such as various mix spray guns of which units variously available under the following trade names are non-limiting examples: GUSMER GX-7, GUSMER GX-7 400 series, GUSMER GX-125 or GUSMER GX-8 impingement mix spray gun. Where such devices are employed, it is contemplated that the two respective components can be mixed under high pressure inside the spray gun for the coating/lining material system. The mixed material is then applied to the desired substrate via the spray gun.

It is contemplated that the applied material can be compounded in a suitable manner to achieve an essentially instantaneous set. It is also considered to be within the purview of this disclosure that the applied material may compounded in such a way as to facilitate or permit post curing operations to be performed on the dispensed material. It is contemplated that any specific post-curing processes involving materials such as aliphatic polyurea bed liner material will be optional in many or most situations.

The method also contemplates various pre-cure and/or pre-application and post cure steps and processes. Non-limiting examples of suitable pre-cure and/or pre-application steps include various surface preparation operations. It is contemplated that the plural component aliphatic sprayable polymeric urea system can be applied to any suitably prepared surface. Non-limiting examples of the pre-application processes or steps include various cleaning operations. It is contemplated that the material can be successfully applied to any surface that is reasonable free of surface dirt and contamination. The surface to which the material is applied can be bare metal or can have any suitable automotive paint or primer material applied thereon.

Additional examples of precure/preapplication steps include various masking operations in order to protect various regions from application or overspray of the plural component aliphatic sprayable polymeric urea system during the application process. Non-limiting examples of suitable masking steps include the application of suitable removable masking materials such as tape adhered polyethylene film, wire-trim masking tape, and the like. Application of the removable masking materials can occur by any suitable method.

It is contemplated that the applied plural component aliphatic sprayable polymeric urea system achieves an initial cure essentially instantaneous with application. By "essentially instantaneous cure" as used herein, it is contemplated that the applied plural component aliphatic sprayable polymeric urea system is stable without appreciable running or puddling upon application with a dry and tack free surface as defined in test method ASTM D 1640 (Standard Test Methods for Drying, Curing, or Film Formation of Organic Coatings at Room Temperature) achieved within three minutes of application.

A non-limiting example of a post cure operation includes removal of masking materials. It is contemplated that the truck bed with the applied plural component aliphatic sprayable polymeric urea system can be subjected to suitable assembly and finishing processes as desired or required.

The plural component 100% aliphatic polyurea system material as disclosed herein may be applied on any suitable substrate surface. In most situations, it is contemplated that the system material can be successfully applied to substrate surfaces that are clean and free of dirt, oils, and other debris. It is contemplated that the target substrate can be cleaned and prepared by any suitable industrial cleaning method. Two examples of locations particularly suitable for application include vehicle pickup truck beds where the spray material functions as a bed liner and vehicular running boards where the material protects against stone chips.

It is contemplated that the substrate material can be any material generally used in the manufacture of automotive vehicles. Materials employed will generally have paintable surfaces. Non-limiting examples of suitable substrate materials include metal, carbon graphite composites, fiberglass, polycarbonates, ABS, and structural polymeric materials, wherein the metal includes steel and polymeric coated steel. While it is contemplated that the material can be employed variously as a bedliner or a running board coating, for ease of discussion the material will be referred to hereinafter as a "bedliner system."

The bedliner system material can be applied directly to the outer surface of the substrate. It is also contemplated that the substrate can be treated with various substrate treatment processes including, but not limited to, various passivation techniques, sealants, automotive paint systems and the like. It is contemplated that the bed liner system material disclosed herein can be applied directly to the substrate surface and achieves the desired level of adhesion. However, where desired or required, it is considered to be within the purview of this disclosure to interpose at least one adhesion promoting material between the substrate and the applied bedliner material.

In spray application processes, it is contemplated that the substrate area to be treated can be suitably masked to inhibit application of the polymeric material such as the aliphatic polyurea spray elastomer system to surfaces outside the area to be coated. The polymeric material such as the 100% aliphatic polyurea spray bedliner system disclosed herein is then applied using the high pressure, high temperature impingement mix plural component equipment.

Spray application can occur in a single pass or multi pass system with the dispensed material applied to an ultimate or final thickness between 25 mils and 100 mils in certain applications. The applied material will be dry and tack free within 3 minutes of application. Once the material is tack free, the masking agent or material can be removed and the bedliner is considered suitable for continued assembly.

It has been found quite unexpectedly that bedliner material that is composed of or contains the aliphatic polyurea system disclosed herein exhibits good adhesion to various painted substrates and remains stable upon prolonged exposure to ionizing radiation and/or various extremes in temperature or environmental challenges.

In particular applications, it is contemplated that the plural component aliphatic sprayable polymeric urea system as disclosed herein will exhibit identifiable characteristics when tested as a free film. The plural component aliphatic sprayable polymeric urea system existing as a free film will exhibit an elastomeric modulus ($E_{COMP}$) as measured by the method outlined in ASTM D 1621. The test material will be a cylindrical test sample having a diameter 30±5 mm, a height two times diameter in which a minimum of 25 over yield point is recorded with compressive modulus and compressive yield point reported. The material tested will be conditioned at one hour at various temperatures of −40 C; 23 C, 50 C and 80 C (±2 C) and will exhibit a minimum. $E_{COMP}$ of 400 MPa. The $E_{COMP}$ of environmentally aged material is 80% of the initial modulus at room temperature. Environmentally aged samples are tested after 30 days at 50±2 C and at 90±5% RH and tested after 10 moisture intrusion cycles with one cycle of 16 hours at 38±2 C and 90±5% RH, 4 hours at −40±2 C and 4 hours at 80±2 C. Samples are conditioned at 23±2 C and 50±5% RH over weekends and holidays.

The resulting film will exhibit a cured flammability as tested by the method outlined in ISO 3795/FMVSS 302 with a maximum burn rate of 100 mm/minute when tested using a specimen size of 355×100×2.0±0.1 mm with a smooth surface.

Additional characteristics exhibited by a film formed from the plural component aliphatic sprayable polymeric urea system will exhibit hardness, durometer Shore A of 90±5 as measured by the method outlined in ASTM D 2240 after 15 seconds. Other characteristics are outlined in the following table.

PHYSICAL CHARACTERISTICS (FILM)

| Physical Characteristic | Value | Test Method |
|---|---|---|
| Tensile strength (min) | 14 MPa | ISO 37/ASTM D 412, die C, 500 mm/min test speed |
| Elongation at Break (min) | 120% | ISO 37/ASTM D 412, die C, 500 mm/min test speed |
| Tear Strength (min) | 60 kN/m | ISO 34, method B, procedure a/ ASTM D 624, Die C, 500 mm/min test speed |
| Water Absorption (max) | 1.5% by wt. | ISO 62/ ASTM D 570 |
| Brittleness (max) | −40 C. | ISO 812, type B specimen/ASTM D 2137, Method A |
| Density | 1.03 ± 0.05 g/cm$^3$ | ISO 1183, Method A/ASTM D 791, Method A1 |
| Heat Aged | | ISO 188/ASTM D 573, 150 ± 50 air changes/h. 1000 h at 100 ± 2 C. |
| a. Hardness change (max) | 5% | |
| b. Tensile strength change (max) | 10% | |
| c. Elongation change (max) | 10% | |

The plural component aliphatic sprayable polymeric urea system as disclosed herein when applied to bare metal will exhibit identifiable characteristics such as those that follow.

APPLIED MATERIAL CHARACTERISTICS

| Physical Characteristic | Value | Test Method |
|---|---|---|
| Film thickness (min) | | FLTM B1 117-01, metallic Substrates, ASTM B 487, non-metallic substrates |
| a. Horizontal application | 1.3 mm (50 mils) | |
| b. Vertical application | 0.8 mm (30 mils) | |
| Sag Resistance | No sag at greater than 2.5 mm | Outlined in Example VIII |
| Peel Strength Adhesion (min) | 4.4 N/mm (25 pli) | Outlined in Example IX |
| Heat Resistance | 240 hours - pass | Outlined in Example X |
| Water Resistance | 240 hours - pass | FLTM B1 104-01 as outlined in Example XI |
| Humidity Resistance | 240 hours - pass | FLTM B1 104-02, method A as outlined in Example XI |
| Corrosion resistance (metallic substrates) | 60 cycles | ASTM D 610 as outlined in Example XII |
| Fluid Spotting Resistance | No color change (AATCC Evaluation 1/ISO 105-A02) dulling surface distortion, permanent softening | FLTM B1 113-01 as outlined in Example XIII |
| Fuel resistance a. Diesel Grade 2 b. C[M15] c. C[M85] | No color change (AATCC Evaluation 1/ISO 105-A02) dulling surface distortion, permanent softening | FLTM BO 101-05 as outlined in Example XIV |
| Xylene resistance | No softening or dulling | As outlined in Example XV |
| Mar resistance | Rating 1 at 7N scratch mark | FLTM BN 108-13, 1 mm diameter ball, smooth surface |
| Scuff resistance (max) | 0.5 g removal | ASTM D 1044, smooth and textured surface, 5000 cycles, 500 g, scuff head A |

-continued

APPLIED MATERIAL CHARACTERISTICS

| Physical Characteristic | Value | Test Method |
| --- | --- | --- |
| Stone chip resistance, −29 C. | No cut through to substrate | SAE J400, 4.7 gravel & FLTM B1 157-06 as outlined in Example XVI |
| Environmental cycling | 3 cycles | FLTM BQ 104-07, Procedure 5 as outlined in Example XVII |
| High performance Adhesion | | As outlined in Example XVIII |
| Resistance against high pressure cleanser | No removal | FLTM BQ 160-04, method B |
| Thermal shock (alternate method) | No removal | FLTM B1 107-05 |
| Volume resistivity | Gtr than $10^9$ ohms | ASTM D 257 |
| Static dissipation | Gtr 0.5 s to 10% max V | NFPA 56-A |
| | Gtr 2 s to zero V | MIL-B-81705-B |
| Weather resistance | No evidence of cracking, checking, rusting, blistering and peeling after designated interval | As outlined in Example XIX |
| a. Natural, exposure time | SAE J1976, procedure A | 3 yr red'd; 2.0 delta E max |
| b. New color | | 1 yr. req'd; 1.0 delta E max |
| c. gloss retention (min) | ASTM D 523, 60 degree Meter 90% | |

Without being bound to any theory, it is believed that the 100% aliphatic sprayable polyurea material as disclosed herein will exhibit most, if not all, of the aforementioned characteristics when applied to the majority of automotive top coats according to the method disclosed herein. It is also believed that minor modifications to the application method can be utilized in achieving the aforementioned characteristics with other non-specified paint systems.

It is also believed that the 100% aliphatic sprayable polymeric can meet or exceed many of the various material and performance standards promulgated by various automotive manufacturers and various standards organizations.

The plural component sprayable aliphatic polyurea system disclosed herein can be employed in a process for applying a bedliner to at least a portion of a pick up truck bed. It is contemplated that such a method can be integrated into a suitable high speed robotic process as desired or required. Such an application method can include the steps of:

admixing a portion of an isocyanate quasi prepolymeric material having an excess of isocyanate equivalent between 12% to 16% defined by % of un-reacted isocyanate equivalent with a portion of at least one catalyst free aliphatic amine compound in a ratio of approximate one to one;

dispensing the admixed material through a spray applicator associated with at least one robotically controlled apparatus on to at least a portion of a substrate on the automotive vehicle; and allowing the dispensed material to cure for an interval sufficient to provide a tack fee surface Admixture of the isocyanate quasi prepolymeric material with a portion of the at least one catalyst free aliphatic amine compound can occur by any suitable admixture process including, but not limited to spray impingement. The ration of quasi prepolymeric material to amine compound is approximately one to one. However variations in ratio of up to 15% are to be considered within the purview of this method in specific applications.

Where desired or required, it is contemplated that the isocyanate quasi prepolymeric material can be prepared from the reaction of an aliphatic diisocyanate with at least one of polymeric polyamine, wherein the aliphatic diisocyanate is at least one of bifunctional monomers of the tetraalkyl xylene diisocyanate, trimerized monomers of aliphatic diisocyanate, biuret forms of aliphatic diisocyanate, cyclohexane diisocyanate, and isophorone diisocyanate as previously discussed.

The catalyst free aliphatic amine compound can be a single compound or a combination of compounds generally including materials such as high molecular weight amine-terminated polyethers, polyether amines and polybutadiene terminated compounds with at least one material having a molecular weight above 2000. Suitable amine terminated materials include, but are not limited to, amine terminated compounds are formed from base polyols selected from the group including polyoxypropylene diols, polyoxypropylene triols, polyester polyols, and multifunctional polyether polyols, the multi functional polyether polyols including di-functional polyether polyols, tri-functional polyether polyols and quad functional polyether polyols, the multifunctional polyester polyols including di-functional polyester polyols, tri-functional polyester polyols, and quad functional polyester polyols.

Upon suitable admixture the resulting material can be dispensed through a spray applicator associated with at least one robotically controlled apparatus on to at least a portion of a substrate on the automotive vehicle. It is contemplated that dispensing can occur by suitable high speed spray application as desired or required. It is contemplated that the material can be applied in one or more passes as desired or required.

After application, the material can be permitted to cure for an interval sufficient to achieve a tack free surface. In the present method it is contemplated that tack free is achieved in three minutes or less in many applications. The material can be permitted to continue curing for an additional interval as desired or required.

The process can include additional suitable steps as desired or required such as subjecting the substrate having the applied material to at least one post curing procedure. Non-limiting examples of such post curing procedures include at least one of demasking and assembly of the treated material into the finished vehicle.

To further illustrate the present invention, the following examples are given. It is to be understood that these examples are provided for illustrative purposes and are not to be construed as limiting the scope of the present invention.

EXAMPLE I

The isocyanate portion of an embodiment of the polymeric composition as disclosed herein was prepared according to the formula set forth in the following table to yield a batch size of 475 pounds:

| RM Description | Proportion | Lbs to Use |
| --- | --- | --- |
| VESTANAT IPDI | 0.4750 | 225.63 |
| JEFFAMINE D-2000 | 0.4750 | 225.63 |
| JEFFSOL PC | 0.0500 | 23.75 |
| Totals | 1.0000 | 475 |

The composition is prepared by the introduction of the portion of VESTANAT IPDI into a suitable mixing chamber under a suitable dry inert gas blanket. The portion of JEFFAMINE D-2000 is added at a rate of 25 pounds per minute. The resulting admixture is permitted to mix for about 1 hour after which the portion of JEFFSOL PC is added to the admixture and permitted to mix for about 30 minutes. The resulting material is believed to be an isocyanate quasi-prepolymer having at least 75% of the hydrogen groups present as amine compounds. The resultant composition was a liquid material under ambient conditions having a viscosity suitable for spraying processes.

VESTANAT IPDI is commercially available from Evolink Industries and is a cycloaliphatic diisocyanate, believed to be isophorone diisocyanate, 3-isocyanatomethyl-3,5,5-trimethyl-cyclohexylisocyanate having an NCO content of 37.5 to 37.8 as measured by ASTM D 2572. JEFFAMINE D-2000 is believed to be a polyetheramine having a difunctional, primary amine structure with an average molecular weight of 2000. The material is commercially available from Huntsman Chemical. JEFFSOL PC is a propylene carbonate commercially available from Huntsman Petrochemical Corporation located in Houston, Tex.

EXAMPLE II

A resin portion of an embodiment of the polymeric composition as disclosed herein was prepared according to the formula set forth in the following table:

| RM Description | Proportion | Lbs to Use |
| --- | --- | --- |
| BASF Amine D-2000 | 0.4200 | 199.6 |
| BASF Amine T-5000 | 0.1000 | 47.5 |
| VESTAMIN IPD | 0.0500 | 23.8 |
| CLEARLINK 1000 | 0.3540 | 168 |
| SILQUEST A-187 | 0.0070 | 3.3 |
| TINUVIN 765 | 0.0100 | 4.7 |
| IRGANOX 1076 | 0.0040 | 1.9 |
| Baylith L-Paste | 0.0050 | 2.4 |
| Black Dispersion | 0.0500 | 23.8 |
| Totals | 1.0000 | 475 |

The resin component composition is prepared by the admixture of the above-listed components in a suitable melt-mixing vessel. The resultant composition is a liquid material under ambient conditions and has a viscosity suitable for spraying processes.

BASF Amine D-2000 and BASF Amine T-5000 are believed to be polyetheramines commercially available from BASF Corporation. D-2000 is believed to be an amine-terminated polyoxypropylene diol of 2000 molecular weight, CAS Registry Number 9046-10-0 having an amine content between 0.95 meq/gm to 1.05 meq/gm. T-5000 believed to be an amine-terminated polyoxypropylene triol of 5000 molecular weight, CAS registry 64852-22-8 having an amine content between 0.52 meq/gm to 0.55 meq/gm.

VESTAMIN IPD is believed to be an isophorone diamine and functions in the composition as a chain extender. VESTAMIN IPD is commercially available from Evolink. CLEARLINK 1000 is commercially available from UOP and is believed to be an aliphatic diamine.

SILQUEST A-187 is employed as an adhesion promoter and is commercially available from OSi Specialties, Inc. in Danbury, Conn. TINUVIN 765 and IRGANOX 1076 are believed to function as UV stabilizers/antioxidants. Baylith L Paste is commercially available from Bayer and is believed to be a zeolite-containing castor oil paste.

The various components are combined at a room temperature and mixed for an interval of 30 minutes. The resulting material is a stable liquid that can be admixed with a suitable isocyanate quasi-prepolymer to produce a dual component sprayable polyurea elastomeric system

EXAMPLE III

Another resin portion of an embodiment of the polymeric composition as disclosed herein was prepared according to the formula set forth in the following table to yield a batch size of 475 pounds:

| RM Description | Proportion | Lbs to Use |
| --- | --- | --- |
| BASF Amine D-2000 | 0.4890 | 232 |
| BASF Amine T-5000 | 0.1000 | 47.5 |
| VESTAMIN IPD | 0.0500 | 23.8 |
| POLYCLEAR 136 | 0.2850 | 135.4 |
| SILQUEST A-187 | 0.0070 | 3.3 |
| TINUVIN 765 | 0.0100 | 4.7 |
| IRGANOX 1076 | 0.0040 | 1.9 |
| Baylith L-Paste | 0.0050 | 2.4 |
| Black Dispersion | 0.0500 | 23.8 |
| Totals | 1.0000 | 475 |

The resin component composition is prepared by the admixture of the above-listed components in a suitable melt-mixing vessel. The resultant composition is a liquid material under ambient conditions and has a viscosity suitable for spraying processes.

Many of the various components are discussed in Example II. POLYCLEAR 136 is believed to be acrylonitrile-modified isophorone diamine (commercially available from BASF Corporation).

The various components are combined at room temperature and are mixed for an interval of 30 minutes. The resulting material is a stable liquid that can be admixed with a suitable isocyanate quasi-prepolymer to produce a dual component sprayable polyurea elastomeric system.

EXAMPLE IV

A plural component aliphatic sprayable polymeric urea system as described in the present disclosure is prepared by the reactive admixture of the isocyanate quasi-prepolymeric material as outlined in Example 1 with the resin component composition as outlined in Example II in a 1:1 ratio using a GUSMER system and is applied to metal surfaces simulating the bed surface of various truck beds using a GUSMER H-2000 proportioning unit and a GUSMER GX-125 impingement spray mix gun. The resulting applied material has a final thickness, of 60 mils. The applied material is tack free after three minutes. The various metal surfaces include at least one bare metal surface and at least one painted surface.

The applied material is allowed to cure for a period of five to eight hours after which it is assessed for various characteristics. The material possesses the characteristics of a Class A automotive finish.

EXAMPLE V

The isocyanate quasi-prepolymeric material as outlined in Example I is admixed with the resin component composition as outlined in Example III in a 1:1 ratio in order to prepare a plural component sprayable polymeric urea system using a GUSMER system. and the material is applied to metal surfaces simulating the bed surface of various truck beds of an automotive vehicle using a GUSMER H-2000 proportioning unit and a GUSMER GX-125 impingement spray mix gun. The resulting material is applied at a thickness of 60 mils. The applied material is tack free after 3 minutes. The various metal surfaces include at least one bare metal surface and at least one painted surface.

The applied material is allowed to cure for a period of 5 to 8 hours after which it is assessed for various characteristics. The material possesses the characteristics of a Class A automotive finish.

EXAMPLE VI

In order to determine sag resistance of suitable plural component aliphatic-sprayable polymeric urea system, materials were prepared as outlined in Examples IV and V, test panels are prepared in which each 75×200 mm panel is coated with the respective materials in a wedge ranging from 0 to 4 mm. The panels are positioned horizontally for 1 hour at 23+/−1 C and the thickness of observed sag is determined along the wedge. The respective samples exhibit no sag.

EXAMPLE VII

Two test panels for each of the formulations outlined in Examples IV and V are prepared according to the directions outlined in Example VI with the material applied to a thickness of 60 mils. The panels are allowed to ambient cure at room temperature for 24 hours prior to further evaluation. After the ambient cure is completed, two parallel cuts are made in the applied material 25 mm apart along the 200 mm length of the panel through to the base substrate with a sharp knife. The tip of the knife is inserted and a tab is peeled back approximately 38 mm long. An Instron Extensometer with a 90 degree constant angle test fixture (or equivalent device) is employed to measure and document the maximum peel strength generated. The test samples exhibit minimum peel strengths of 4.4 N/mm.

EXAMPLE VIII

Another alternate evaluation of the compositions of Examples IV and V was conducted using the methodology outlined in ASTM D903. The materials performed favorably.

EXAMPLE IX

Test panels are prepared according to the method outlined in Example VI using the materials outlined in Examples IV and V applied to respective test panels at a thickness of 60 mils. The samples are placed in a mechanical convection oven at 80° C. and are observed at various intervals. The materials demonstrate no evidence of blistering, cracking, charring, embrittlement or other deleterious effects after 240 hour heat exposure. After 240 hours have elapsed with no visible degradation, the samples are tested according to the peel test outlined in Example VII and exhibit minimum peel strengths of at least 4.4 N/mm.

EXAMPLE X

In order to ascertain the water and humidity resistance of the plural component aliphatic sprayable polymeric urea bedliner system as disclosed herein materials are prepared according to the methods outlined in Examples VI and V. Test panels are prepared according to the process outlined in Example VI with the respective material applied at a thickness of 60 mils. Water and humidity resistance can be ascertained by various methods promulgated by various standards organizations such as ASTM, DIN/SAE, and others. Various company-specific methods have also been proposed. For purposes of this analysis, individual test panels bearing the respective materials are tested according to the procedures outlined in FLTM B1 104-01 and FLTM B1 104-02, method A, respectively as of Jun. 1, 2008. Such procedures are published by Ford Motor Company. Copies of the test methods can be obtained from a variety of sources. After 240 hours, the test panels exhibit no blistering, dulling, softening and/or any other film failure. After visual inspection, the various text panels are also tested using the peel strength adhesion test outlined in Example VII. The various materials exhibit minimum peel strength of 4.4 N/mm. Similar favorable results are found when the coating is evaluated according to the methodology of SAE J1976 and the methodology outlined in ASTM 1735.

EXAMPLE XI

Test panels are also prepared according to the method outlined in Example VI in order to ascertain corrosion resistance. The compositions as outlined in Examples V are applied to respective test panels at a thickness of 60 mils. Corrosion resistance can be ascertained by various test methods such as those generally promulgated by standards organizations such as ASTM, DIN, and others. These test methods have been incorporated into various company-specific test methods. Methodologies such as those promulgated by Ford Motor Company as Ford. Laboratory Test Methods (FLTM) are believed to incorporate ASTM methodology. The methods discussed herein are readily and publicly available. For example, the Ford test methods referred to are available upon request from Ford Motor Company. Corrosion resistance can be ascertained by the methodology outlined in FLTM BQ 105-01. The methodology outlined in FLTM 123-03 and FLTM B1-01 is employed in order to define the scribe technique to be employed. Materials are considered to pass if there is no more than 3 mm maximum scribe creepage and face corrosion no greater than grade 6 as defined in ASTM D 610 at the conclusion of corrosion exposure. The samples are visually inspected and found to pass. Similar results are obtained when the coating is evaluated using the methodology outlined in ASTM B 117 (salt spray), and SAE J2334.

EXAMPLE XII

Test panels are prepared according to the procedure outlined in Example VI using the compositions outlined in Examples IV and V applied to a thickness of 60 mils. The respective test panels are evaluated for fluid spotting resistance using the method outlined in FLTM B1 113-01 against various fluid materials employed in or with automotive vehicles. These materials include the following:

| Material | Concentration | Result |
|---|---|---|
| Liquid Soap | Neat | pass |
| Windshield solution | Neat | pass |
| Windshield solution | 30% in deionized water | pass |
| Coolant solution | Neat | pass |
| Coolant solution | 30% in deionized water | pass |
| Motor oil | Neat | pass |
| Bug & tar remover | Neat | pass |

For purposes of fluid spotting resistance, a material passes if no color change in excess of Gray Scale rating 4-5 (AATCC Evaluation Procedure 1/ISO 105-A02), dulling, surface distortion or permanent softening is observed. The materials are visually inspected and found to pass.

EXAMPLE XIII

Test panels are prepared according to the procedure outlined in Example VI using the compositions outlined in Examples IV and V applied to a thickness of 60 mils. The test panels are evaluated for fuel resistance using the procedures outlined in FLTM BO 101-05. The definitions of the various fuel compositions are found in ASTM D 471/ISO 1817. The various fuels employed are as follows:

| Designation | Composition | Outcome |
|---|---|---|
| Reference Fuel F | Diesel fuel grade #2, 100% | pass |
| Reference Fuel I | C[M15] | pass |
| Reference Fuel K | C[M85] | pass |

For purposes of this evaluation, the respective material is deemed to have passed if, after a five minute recovery time, no color change in excess of Gray Scale rating 4-5 (AATCC Evaluation Procedure 1/ISO 105-A02), dulling, surface distortion or permanent softening is observed. The materials are visually inspected and found to pass.

EXAMPLE XIV

Test panels are prepared according to the procedure outlined in Example VI using the compositions outlined in Examples IV and V applied to the respective test panels at a thickness of 60 mils. The respective test panels are evaluated for xylene resistance by rubbing the surfaces of the coatings of the respective test panels with a cheesecloth wetted with xylene in a circular motion 10 times. The treated coating materials exhibited no softening or dulling.

EXAMPLE XV

Test panels are prepared according to the procedure outlined in Example VI using the compositions outlined in Examples IV and V applied to the respective test panels at a thickness of 60 mils. The respective test panels are evaluated for stone chip resistance at −29° C. The various test panels are tested using the procedures outlined in FLTM B1 157-06 and in SAE J400 using 4.7 liters of gravel. The materials were observed at the end of the test and no cut through to the substrate surface is observed. The treated materials are then tested for peel strength adhesion according to the procedure outlined in Example VII. The materials exhibit an adhesion of at least 4.4 N/mm and is considered to meet or exceed minimum requirements.

EXAMPLE XVI

Test panels are prepared according to the procedure outlined in Example VI using the compositions outlined in Examples IV and V applied to the respective panels at a thickness of 60 mils. The respective test panels are evaluated for durability against environmental cycling using the procedures outlined in FLTM BQ 104-07, Procedure 5. Evaluation occurs after 20 hours of conditioning at 23+/−2° C. The material is observed after each cycle. The coating on the various test panels has no evidence of cracks, blistering or changes in appearance or other failures when measured against an original unaged part. The peel strength adhesion of the treated panels is also evaluated according to the procedure outlined in Example VII. The materials exhibit an adhesion of at least 4.4 N/mm.

EXAMPLE XVII

Test panels are prepared according to the procedure outlined in Example VI using the compositions outlined in Examples IV and V applied to the respective metal panels at a thickness of 60 mils. The test panels are evaluated for high performance adhesion using the procedures outlined in FLTM BO 160-04, Method B. Prior to the procedure, the coated surface of the test panels are each X-scribed through to the substrate at a 30 degree angle the test performed on the X-scribe. No coating removal is observed.

EXAMPLE XVIII

Test panels are prepared according to the procedure outlined in Example VI using the compositions outlined in Examples IV and V applied to the respective metal panels a thickness of 60 mils. The respective test panels are evaluated for weather resistance. The evaluation procedure is designed to approximate use conditions under Florida weather conditions. Where applicable, the materials are tested according to the procedures outlined in SAE J 1976, Procedure A to determine weathering as a result of natural exposure. The materials so tested exhibit no evidence of cracking, checking, rusting, blistering or peeling after effective exposure equaling three years Florida exposure with a maximum delta E of 2.0 being permitted. The test samples are essentially free from mildew and show a minimum of dirt retention. When evaluated for new color retention, the materials exhibit essentially unchanged color qualities after an effective one year of Florida exposure with gloss retention of 90% as determined by ASTM D523m 60 degree meter.

Upon completion of the weather resistance testing, the samples are washed per the procedures outlined in FLTM B1160-01, B, 1 and placed in a de-ionized water bath for 16 hours according to the procedures outlined in FLTM B1 104-01. After the panels are removed from the water bath and thoroughly blown dry, the adhesion peel strength is assessed according to the procedure outlined in Example VII. The test samples exhibit minimum peel strengths of at least 4.4 N/mm.

In order to access the applicability of the disclosed materials under accelerated weather testing procedures, additional test panels are prepared according to the procedure outlined in Example VI using the compositions outlined in Example V applied to a thickness of 60 mils. The samples are tested under the procedures outlined in SAE J1960, 0.55 W/m² irradiance using borosilicate inner and outer filters. After 3000 hours exposure, the samples evidence a change in color of less than 1.0 delta E. After 3600 hours exposure, the samples exhibit no evidence of cracking, checking, rusting, blistering or peeling.

Samples were also evaluated according to the methods outlined in ASTM G154, D4585 and found to meet or exceed minimum requirements.

EXAMPLE XIX

To further evaluate the physical and performance characteristics of the plural component, sprayable aliphatic polyurea bedliner system compositions of Examples IV and V were prepared. The compositions were applied to various 70×150 mm metal test panels to a thickness of 2.0 mm±0.2 mm in order to achieve either a smooth or textured outer surface. The various test panels have various surface preparations as e-coat only; e-coat and primer; e-coat and base coat, and e-coat, base coat, and clear coat. The e-coat employed is the primer system. The e-coat employed for purposes of this evaluation is a commercially available water based urethane chemistry system that is applied at a film thickness of 0.79 to 1.01 mils. The base coat a urethane chemistry material applied at a film thickness 2 to 5 mils. The clear coat is a urethane based chemistry material applied at a film thickness of 1 to 3 mils. The E-coat is allowed to dry/cure for more at least 24 hours prior to further operations. The base coat and subsequent clear coat where tested are then allowed to set for at least 24 hours prior to further, processing, testing and/or further evaluation.

EXAMPLE XX

Weather resistance of applied coatings of the compositions outlined in Examples IV and V are prepared using the spray application technique of Example VI using test panels prepared as outlined in Example XIX. The various test panels are tested according to the method outlined in Nissan Test Method No. 4.2, XWOM 864 h. No chalking, cracking, swelling, blistering, discoloration or adhesion failure is detected in any test sample. Nissan test methods employed are those available as of Jan. 1, 2008. Test panels are prepared using the test compositions as outlined in Examples IV and V. The various test panels are tested according to the method outlined in Nissan Test Method No. 4.3. The test panels are exposed to 90° C. for 500 hours in a constant temperature chamber. The test panels are compared to panels maintained at 20° C.±1° C. for the same interval. No chalking, cracking, swelling, blistering, discoloration or adhesion failure is detected in any test sample upon visual inspection under a fluorescent lamp.

EXAMPLE XXI

Cold resistance characteristics of the compositions outlined in Examples IV and V were ascertained to evaluate durability and abrasion resistance of the bedliner compositions disclosed herein at low temperatures.

E-coated test panels with smooth coating surfaces were prepared according to the procedure in Example XIX with the compositions outlined in Examples IV and V are placed in a low temperature constant humidity controlled chamber set at −40° C.±2° C. for an interval of 3 hours. After cooling, the various test panels are immediately evaluated for shock resistance according to the procedures outlined in NES M0007, item 27 and for abrasion resistance according to the chipping test outlined in NES 0007, item 28. Chipping resistance is analyzed according to the procedures outlined in item 28.3.6 (2) of NES M0007. No chipping, cracking or adhesion failure is observed on the test panels.

EXAMPLE XXII

Initial adhesion of plural component sprayable aliphatic polyurea bedliner systems as disclosed herein is ascertained by preparing e-coated test panels prepared according to the procedures outlined in Examples XIX using compositions outlined in Examples IV and V using the spray application techniques outlined in Example VI.

The materials are tested using an Instron mechanical tester with appropriate holding fixtures such as a bottom fixture with a one square inch surface (~1.125 inch diameter). The surface of the bottom fixture is abraded immediately prior to testing to remove oxidation and/or residue and wiped with a solvent such as isopropyl alcohol to remove grit.

The test panels are prepared by cutting a 1.25 inch hole through the bedliner material to the surface of the metal substrate using a 1.25 inch hole saw.

A suitable room temperature curing, commercially available, two-part epoxy adhesive is prepared according to manufacturer instructions and applied as a thin film to the face of the bottom fixture. Five mil glass spacers are applied to the surface of the epoxy and the prepared button fixture is pressed onto the area of the bedliner in the center of the 1.25" hole. Any excess epoxy is wiped from the edge of the button and the hole and the epoxy is allowed to cure for at least 8 hours.

After curing, the fixture is attached to the Instron test device and the appropriate load cell is selected based upon expected values; typically one that will verify an adhesion strength greater than 200 lbs/in². Once the sample is securely attached using suitable grips and fixtures, the sample is pulled until it fails. Upon failure, the sample is removed and the maximum load and failure made as noted.

The cured epoxy can be removed from the button fixture by any suitable method such as heating the fixture, for 30 to 60 minutes in an oven at 150 to 175° C. followed by scraping and sanding.

The coating material adhesion values exceed 200 lbs/in².

EXAMPLE XXIII

Hot water resistance characteristics of bedliner compositions disclosed herein are also ascertained. Hot water resistance is determined by the amount of blistering and general deterioration that occurs when the bedliner composition is exposed to hot water. E-coated test panels outlined in Example XX are coated with the compositions outlined in Examples IV and V according to the process outlined in Example VI and Example XIX.

The respective test plates are placed in constant temperature controlled bath set to 40° C.±1° C. and maintained in the bath for 500 hours. At the conclusion of the immersion interval, the panels are removed from the bath and examined for blistering, discoloration, and surface gloss. No chalking, cracking, swelling, blisters, or discoloration is observed.

Coating adhesion after hot water exposure is determined using the procedure outlined in Example XXII. The adhesion values meet or exceed 200 lb/in².

EXAMPLE XXIV

The ability of the plural component sprayable aliphatic polyurea bedliner system disclosed herein to perform under conditions of high humidity is ascertained. Compositions as outlined in Examples IV and V are applied to e-coated test panels according to the specifications outlined in Example XIX using the technique outlined in Example VI The test panels are placed in a temperature and humidity controlled oven at a temperature of 60° C.±1° C. at 95% humidity or greater for an interval of 240 hours. While in the oven, the test panels are maintained at an orientation of 45°. After 240 hours, the test panels are removed and examined for blistering, discoloration, and surface gloss. No chalking, cracking, swelling, blistering, or discoloration is evidenced.

The test panels are allowed to set at room temperature for 24 hours after which adhesion strength is ascertained according to the method outlined in Example XXII. Coating material adhesion exceeds 200 lb/in$^2$.

EXAMPLE XXV

In order to ascertain corrosion resistance of bedliners coated with the plural component sprayable aliphatic polyurea bedliner system disclosed herein, compositions prepared according to the procedures outlined in Examples IV and V were applied using the spray applicator device outlined in Example VI to e-coated test panels according to the procedures outlined in Example XIX. The object of the investigation is to examine the degree of rusting, blistering, and adhesion of the bedliner in corrosive environments such as salt spray, heat drying, and humidifying.

Test panels are placed in a suitable salt spray testing device such as that specified in NES M-0140 using a salt solution with a salt concentration of 5±1% by weight at a spray bath temperature of 35±1° C.

The edges of the test panels are protected by a suitable coating material known to withstand testing exposure. Using a suitable plastics cutter knife, two cross lines are cut to the substrate with the lines reaching from 10 mm from each edge of the test panel. The test panels are placed in the salt spray tester with the bedliner surface facing up such that the test piece is parallel to three directions of spray that must flow at an angle of 15° with respect to the vertical line so that the spray mist will be evenly applied to the testing surface.

The panels are exposed to the salt spray for 1000 hours with no evidence of chalking, cracking, blistering, discoloration extending from the crosscut portion and no peeling in the crosscut portion and no peeling in the crosscut.

EXAMPLE XXVI

Test panels prepared according to Example XXV are also evaluated using a combined corrosion method using the device specified in NES M 0158. The panels are exposed in the following manner: Salt spray (5±1% salt) for 4 hours at 35° C.; dry heat at 60° C. for 2 hours; humidifying (95% relative humidity) at 50° C. for 2 hours. After 100 cycles, the panels are removed and inspected for rust and blisters extending from the crosscut portion and for peeled or peeling regions. No evidence of chalking, cracking, swelling, blisters, discoloration or adhesion failure is indicated.

The ability of the materials as disclosed herein to resist chipping and denting such as stone chips can also be assessed by suitable tests such as gravelometer testing as specified in SAE J 400 using materials such as those specified in methodologies such as JIS A 5001 crushed stone with grain size in ranges such as 13 to 5 mm and between 6 and 2.5 mm and ISO 4032 hexagonal brass nut style 1 with M2 threads. The material resists chipping when tested with this type of shot both on visual inspection and after 72 hour salt spray testing.

EXAMPLE XXVII

In order to further ascertain the resistance and, durability of the plural component aliphatic sprayable polyurea bedliner composition as disclosed herein to extremes of heat and cold, e-coated test panels as outlined in Example XIX are spray coated with compositions as outlined in Examples IV and V to a thickness of 2.0±0.2 mm.

The panels are placed in a suitable constant temperature humidity controlled chamber and cycled through suitable chambers including a constant temperature chamber and a low temperature chamber. The thermal cycle conditions are as follows: a) 4 hours at 90±2° C., 20% RH maximum; b) 0.5 hour at room temperature at 20±1° C.; c) 1.5 hours at −40±2° C.; d) 0.5 hour at room temperature; e) 3 hours at 70±2° C., 95% RH; f) 0.5 hour at room temperature; g) 1.5 hours at 40±2° C.; and h) 0.5 hours at room temperature. After 10 cycles, the test panels were evaluated. No evidence of cracking, staining, peeling, swelling, rust, blistering, chalking The panels were further evaluated according to the adhesion test procedures outlined in Example XXII. The various bedliner materials have adhesion values greater than 200 lbs/in$^2$ upon completion of heat cycle testing.

EXAMPLE XXVIII

The plural component aliphatic sprayable polyurea bedliner system as disclosed herein is evaluated for salt-water resistance. Test panels are prepared according to the procedures outlined in Example XIX using the compositions outlined in Examples IV and V applied by spray application to a thickness of 2.0 mm+/−0.2 mm according to the procedures outlined in Example VI The test panels were immersed in a constant temperature bath containing a 5% salt solution at 40±1° C. The test panels are maintained in the salt bath for 120 hours after which the test panels are removed and allowed to dry at room temperature. No evidence of softening, peeling, blistering, discoloration, etc. was detected.

EXAMPLE XXIX

The plural component, aliphatic polyurea bedliner system was evaluated for thermal non-adhesive characteristics. E-coated test panels were prepared according to the procedures outlined in Example XIX by spray application procedures defined in Example VI using compositions as outlined in Examples IV and V in order to study the tendency of the bedliner to become tacky or adhesive under high temperature air conditions.

The test panels are placed horizontally with the bedliner surface facing up. Five 50 mm$^2$ pieces of pharmaceutical grade gauze are placed in a constant temperature oven at 90±1° C. for 1 hour. The test pieces are removed from the oven and the gauze is removed from the test panels and the surface of the test piece is observed for any gauze trace. No gauze trace is observed.

EXAMPLE XXX

The resistance of the plural component sprayable aliphatic polyurea bedliner system disclosed herein is evaluated for the effect of soot and other acidic substances is evaluated. Compositions as outlined in Examples IV and V are prepared and spray applied to E-coated test panels to a thickness of 2.0 mm±0.2 mm. according to the procedure outlined in Example XIX using the spray application procedures outlined in Example VI.

The test panels are maintained in an environment free from draft and direct exposure to sunlight at a temperature of 20±1° C. at a relative humidity of; 73±5%. An aliquot of 0.2 ml of 10% V/V sulfuric acid is placed on the bedliner surface for 24 hours. After 24 hours, the test panels are water-rinsed and wiped with a clean cloth. No discoloration, dulling, softening, staining, swelling, etc. is detected.

EXAMPLE XXXI

Alkali resistance of the plural component sprayable aliphatic polyurea bedliner system as disclosed herein is determined. E-coated test panels are prepared according to the procedures outlined in Example XIX by spray application as outlined in Example VI to achieve a smooth surface using the compositions outlined in Examples IV and V.

The test panels are placed in the horizontal position with the bedliner material facing upward in a room at a constant temperature (20±1° C.) and humidity (73±5%) with minimum draft and away from direct sunlight. A 0.2 ml portion of 5% w/w caustic soda solution is placed on the surface of the test panel and is permitted to remain for four hours. After 4 hours, the caustic solution is rinsed off and the test panel is wiped with a clean cloth and visually inspected. No discoloration, dulling, softening, swelling, etc. is detected.

EXAMPLE XXXII

The resistance of the plural component sprayable aliphatic polyurea bedliner system as disclosed herein to exposure to antifreeze is ascertained. E-coated test panels are prepared using compositions as outlined in Examples IV and V according to the procedure outlined in Example XIX using the spray application procedure outlined in Example VI. The material is applied at a thickness of 2.0±0.1 mm with a smooth surface finish.

One half of each test panel is immersed in a beaker containing approximately 150 ml of undiluted class 3 antifreeze as specified in NES M 5059. The test panel is allowed to remain in the antifreeze material for 24 hours after which the panels were removed, rinsed with water, and wiped clean. The test panels are visually inspected. No discoloration, fixing of antifreeze pigment, dulling, softening, or swelling is observed.

EXAMPLE XXXIII

The resistance of the plural component sprayable aliphatic polyurea bedliner system to engine oil is evaluated. E-coated test panels as outlined in Example XIX are prepared using the compositions as outlined in Examples IV and V spray applied according to the spray application procedures outlined in Example VI at a thickness of 2.0±0.2 mm with a smooth surface.

One half of each test panel is immersed in a beaker containing approximately 150 ml SJ 5W-30 engine oil at a temperature of 20±1° C. and 73±5% relative humidity. The test panels are allowed to remain in contact with the engine oil for 24 hours. After this the test panels are cleaned and visually inspected. No discoloration, dulling staining, softening, swelling, etc. is detected.

EXAMPLE XXXIV

Resistance of the plural component sprayable aliphatic polyurea bedliner system to gasoline is determined. E-coated test panels are prepared according to the procedures outlined in Example XIX using compositions prepared according to the procedures outlined in Examples IV and V spray applied according to the procedures outlined in Example VI at a thickness of 2.0±0.2 mm with a smooth surface.

One half of each test panel is immersed in a beaker containing 150 ml of each respective gasoline sample. The three samples of gasoline tested are lead-free gasoline, high octane gasoline, and leaded premium gasoline as outlined in NES M5052.

Test panels are positioned at 45° angles with the coated side facing up. One ml of the respective gasoline material is dropped on the associated test surface every 3 seconds from the top of the test piece for a total of 10 times.

The test panels are visually inspected upon completion of the test and again 24 hours after completion. No evidence of discoloration, dulling, softening, staining, swelling etc. is found.

EXAMPLE XXXV

The ability of the plural component aliphatic sprayable polyurea bedliner system as disclosed herein to withstand staining or discoloration as a result of exposure to tree sap is determined. E-coated test panels are prepared by the spray application of the compositions outlined in Examples IV and V using application technique outlined in Example XIX employing the spray procedure outlined in Example VI. The coatings are applied to a thickness of 20±0.1 mm.

A 0.2 ml portion of reagent grade cedar oil is dropped onto the surface of each test panel at room temperature (20±1° C.) and the panels bearing the cedar oil are placed horizontally in a temperature controlled chamber at 50±1° C. for 1 hour. After heating for one hour, the panels are removed from the temperature controlled chamber, wiped with ethanol, and visually inspected. No discoloration, dulling, staining, softening, or swelling is observed.

EXAMPLE XXXVI

The ability of the plural component aliphatic sprayable polyurea bedliner system as disclosed herein to withstand staining or discoloration as a result of exposure to bird droppings is determined. E-coated test panels are prepared by the spray application of the compositions outlined in Examples IV and V using application technique outlined in Example VI. The coatings are applied to a thickness of 20±0.1 mm. In order to simulate bird droppings, a 3% solution of albumin made from egg and containing total nitrogen of 12 to 14%.

A 0.2 ml portion of the albumin solution is dropped on the surface of the test panels at room temperature. The test panels are allowed to sit horizontally in a temperature controlled chamber held at 50+/−1° C. and 30+/−5% RH for one hour. The test pieces are removed from the temperature controlled chamber, wiped with a soft dry cloth and allowed to sit for 24 hours. After standing the test panels are inspected. The test panels exhibit no evidence of discoloration, dulling, staining, or swelling.

EXAMPLE XXXVII

Resistance of the plural component sprayable aliphatic polyurea bedliner system disclosed hereinto various solvents is determined. E-coated test panels are prepared according to the procedures outlined in Example XIX using compositions prepared according to the procedures outlined in Examples IV and V spray applied according to the procedures outlined in Example VI at a thickness of 2.0±0.2 mm with a smooth surface.

Test panels are placed flat at room temperature conditions (20+/−1 C) at a humidity of 73+/−3% RH. A one ml portion of each of the respective solvents are dropped on the surface of an associated test panel and allowed to stand for 24 hours. The solvent tested are ethanol, methyl ethyl ketone, isopropyl alcohol and naptha.

After testing, the solvent is wiped off with a soft dry cloth. The test panels are examined for discoloration, dulling staining, softening or swelling immediately after cleaning and again after 24 hours. No such evidence is observed.

EXAMPLE XXXVIII

The abrasion resistance of the plural component aliphatic sprayable polyurea bedliner system as disclosed herein is determined. E-coated test panels are prepared by the spray application of the compositions outlined in Examples IV and V using application technique outlined in Example XIX employing the spray procedure outlined in Example VI. The coatings are applied to a thickness of 20±0.1 mm and are finished with a smooth surface.

The test panels are evaluated in at standard room temperature of 20+/−1° C. and 73%+/−3% RH using a Taber abrasion tester equipped with an abrasion wheel CS-10F which is cleaned by rotation over a zinc plate or sandpaper after each test. The Taber tester is operated at a load of 50N with a table rotation speed of 60 rpm. Each test panel is subjected to 100 rotations. Abrasion is reported and is typically found to be within accepted parameters.

EXAMPLE XXXIX

The impact resistance of the plural component aliphatic sprayable polyurea bedliner system as disclosed herein is determined. E-coated test panels are prepared by the spray application of the compositions outlined in Examples IV and V using application technique outlined in Example XIX employing the spray procedure outlined in Example VI. The coatings are applied to a thickness of 20±0.1 mm and are finished with a smooth surface.

Each respective test piece is placed in a DuPont test device such as the one specified in JIS K 5400 with the coated side facing up between the striker (6.35+/−0.03 mm radius) and the anvil. A weight weighing 500+/−1 gm is dropped onto the surface from a height of 50 mm, the height as specified in NES M0007.

Testing occurs on individual samples at room temperature (20+/−1° C.) and at low temperature (−40+/−1° C.). No significant damage occurs to the surfaces.

EXAMPLE XL

The plural component aliphatic sprayable polyurea bedliner system as disclosed herein when exposed to gravel is determined. E-coated test panels are prepared by the spray application of the compositions outlined in Examples IV and V using application technique outlined in Example XIX employing the spray procedure outlined in Example VI. The coatings are applied to a thickness of 20±0.2 mm and are finished with a smooth surface. During the test, the coatings are maintained at a temperature of 20+/−1° C.

The test is conducted using a gravelometer as specified in SAE J 400 in order to test for chip resistance of the coating materials. The coating materials are evaluated using various different impact materials. The materials employed are crushed stone Number 6 grade, crushed stone number 7 grade and M2 nuts. The crushed stone type and grade is defined in JIS 5001 as crushed stone for road construction. Number 6 grade stone employed is capable of passing through a 20 mm nominal sieve opening but does not pass through as 5 mm nominal sieve opening and typically has a grain size of 13 to 5 mm. Number 7 grade crushed stone employed is capable of passing through a 13 mm nominal sieve opening put is not capable of passing through a 2.5 mm nominal sieve opening. In both instances, the number of uses should be limited to three shots after which the stones are screened again to insure consistence in size.

The nuts employed are those defined in ISO 4032 as hexagon nuts style number 1 with an MS thread size made of brass with no additional surface treatment.

The gravelometer resistance test is set up so that the specific shot material will strike the given test piece at the desired angle. For purposes of this evaluations tests are conducted such that the specific hot material strikes the given test panel at 20° and 45° angles respectively. The shot in loads of 250 gm+/−2 g and is discharged at a pressure of 5.0+/−1 kg/sq cm. Each test panel can be subjected to multiple shots with three being optimum for testing purposes.

After discharge is complete, the respective test pieces are removed for the test device, unnecessary shot material is removed from the surface of the test panel with a suitable adhesive or cellophane type tape. The surfaces are wet cleaned and checked for peeling. The samples are then subjected to salt spray testing as outlined in Example XXV. No damage was detected on either initial observation or upon completion of salt spray testing.

EXAMPLE XLI

The adhesion between two layers of plural component aliphatic sprayable polyurea bedliner system as disclosed herein applied at different times is also ascertained. E-coated test panels are prepared by the spray application of the compositions outlined in Examples IV and V using application technique outlined in Example XIX employing the spray procedure outlined in Example VI.

After the initial application, a specified interval is allowed to elapse, after which a second layer of the same material is applied to the same thickness by the spray application technique outlined in Example VI. Elapsed time intervals of one hour, 2 hours, 24 hours, 1 week and one month. In each instance, the second applied layer is allowed to cure for an additional 24 hours. Upon completion of the cure period, the adhesion strength of each of the applied layers is evaluated using the technique outlined in Example XXII. Sufficient levels of bond strength are obtained with no significant evidence of interlayer delamination. Bond strengths greater than 200 lbs/sq inch are expected.

Test panels are prepared in which a layer of the composition outlined in Example V is applied in overlying relationship to a layer of the composition outlined in Example IV in the manner disclosed herein. Test panels are also prepared in which a layer of the composition outlined in Example IV is applied in overlying relationship to layer of the material outlined in Example V. The resulting test panels are evaluated according to the method outlined in Example XXII. Significant levels of bond strength are obtained with no significant evidence of interlayer delamination. Bond strengths greater than 200 lb/sq inch are expected.

EXAMPLE XLII

The flammability of plural component aliphatic sprayable polyurea bedliner system as disclosed herein is determined.

E-coated test panels are prepared by the spray application of the compositions outlined in Examples IV and V using application technique outlined in Example XIX employing the spray procedure outlined in Example VI. Testing and evaluation are conducted under standard temperature and pressure; i.e. 20+/−1° C. and 73%+/−3% RH. Prior to testing a thermistor thermometer is placed on the coating at the center the coated panel.

Using a Bunsen burner having a flame adjusted to 50 mm, each test panel is held, coated side down at a 45° angle. The test panel is heated up to a specified temperature and the temperature of the ignition and combustion period is determined. The coating material does not ignite below a temperature of 200° C. and, upon ignition, self extinguishes within two inches of the ignition point.

EXAMPLE XLIII

The durometer hardness of representative samples of plural component aliphatic sprayable polyurea bedliner system as disclosed herein is determined. Film layers of bedliner material are prepared by the spray application of the compositions outlined in Examples IV and V using application technique outlined in Example XIX employing the spray procedure outlined in Example VI to produce films. The films are sprayed to a thickness of 6 mm, minimum. This thickness is accomplished in various ways: a single thickness and/or stacks of up to three layers of the material under inspection. The film samples employed are free from flaws such as foreign objects and bubbles. The test samples have a lateral size such that the point of the push needle used in the analysis is at least 12 mm away from the edge of the test specimen and configured to tightly adhere to the pressure face.

Durometer hardness is assessed using the methodology outlined generally in JIS M0514 1995 with specific matters and adjustments outlined below.

Figure 1:
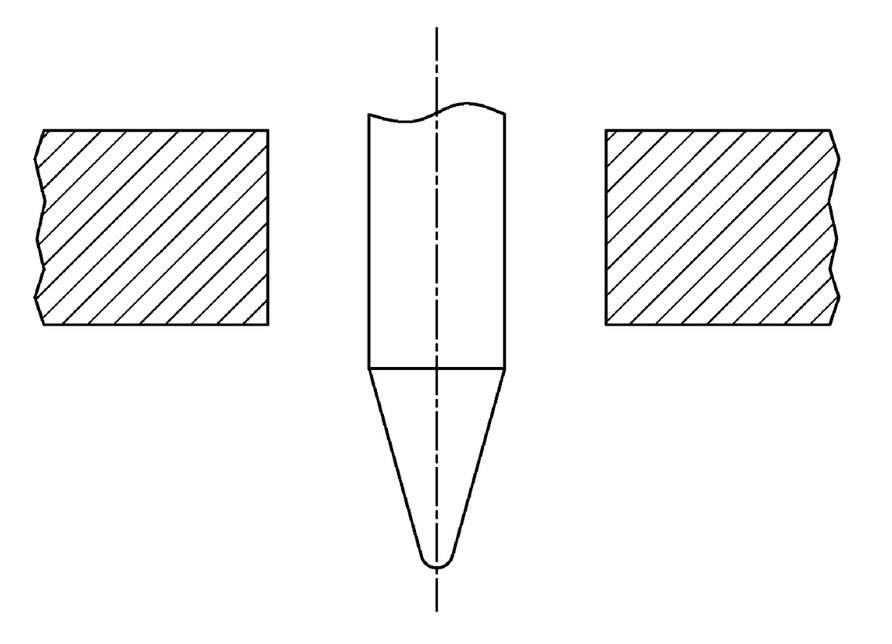

The analysis is carried out using a test machine that consists of a pressure face configured to pressurize the surface of the respective specimens. The pressure face is a flat surface vertical to a push needle configured with a hole of 3.0+/−0.2 to 5.0 mm in diameter. The pressure face is at least 5.0 mm from the center of the push needle. The test machine also includes a push needle made of a material resistant to wear and rust of a shape and type outlined in FIG. 1

The scale for the test device is configured such that, when the reading is 0, the point of the push needle is projected from the pressure face by 2.5+/−0.04 mm. When the reading is 100, the point of the push needle is flat with the pressure face. The test device also includes a suitable spring. The relationship between the spring and the scale complies with the formula:

$$W_o = 444.5 H_o \quad (I)$$

Where:
$W_o$ is the spring force of type D durometer (mN);
$W_o$ is the spring force of type D durometer (gf);
$H_o$ is hardness of type D durometer, with the tolerance of the force being +/−44.9 gffor type D durometer.

In order to test each individual piece, the film specimen is placed on a rigid, hard flat surface. The durometer is held so that the push needle is at a right angle to the measurement surface of the specimen. The pressure surface is tightly pressed to the measurement surface. The average durometer reading for each sample is reported. Durometer readings typically are between 55 to 65 Shore D.

EXAMPLE XLIV

The elongation value of representative samples of plural component aliphatic sprayable polyurea bedliner system as disclosed herein is determined. Film layers of bedliner material are prepared by the spray application of the compositions outlined in Examples IV and V using application technique outlined in Example XIX employing the spray procedure outlined in Example VI to produce films. The film material is applied to release paper overlaying a flat glass or steel plate with dimensions of 100×100 mm to form a flat film having a uniform thickness of 2 mm.

After curing, the material is removed from the plate and punched with a Number 3 dumbbell die as outlined in section 3.2 of JIS K 6301. Parallel gage marks of 20 mm are placed on the film The test pieces are each placed in a tensile load tester as specified in section 28.2 of NES M0084 such that the load will be at the center of the dumbbell test piece. The maximum elongation of the gage marks is measured by scale or vernier caliper while the test piece is being pulled. Percent elongation is calculated using the equation:

$$E_0 = \frac{L_1 - L_0}{L_0} \times 100$$

Where:
$E_0$ is elongation percentage
$L_0$ is gage length before test (mm)
$L_1$ is gage length at breaking point.

EXAMPLE XLV

Material compositions such as those outlined in Examples IV and V are prepared omitting the black dispersion pigment agent. The resulting materials are essentially clear to colorless. The material can be applied as outlined in previous examples and performs as previously outlined.

EXAMPLE XLVI

Material compositions such as those outlined in Examples IV, V, and XLV are evaluated for use as coating composition on vehicular running boards and found to be satisfactory with compositions outlined in Example XLV being capable of permitting underlying paint color to be perceived.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. An automotive vehicle having at least one vehicular exterior surface, the vehicular exterior surface comprising:
   a structural substrate, the substrate having an outwardly oriented surface;
   at least one polymeric layer in overlying relationship to at least a portion of the outwardly oriented surface of the structural substrate, the polymeric layer containing at least one polymeric material formed from the reaction of at least one isocyanate with at least one resin component to yield a polyurea, the resin component comprising at least one catalyst free aliphatic amine having at least 75% of hydrogen groups as amine compounds.

2. The vehicular exterior surface of claim 1 wherein the polymeric material is composed of a plural component aliphatic sprayable polymeric urea system comprising urea linkages formed by the reaction of active amine hydrogen groups with isocyanate quasi prepolymers of an aliphatic isocyanate monomer.

3. The vehicular exterior surface of claim 1 wherein the plural component aliphatic sprayable polymeric urea system is formed from the reactive admixture of a resin component and an isocyanate quasi prepolymer, wherein the resin component comprises at least one of high molecular weight amine-terminated polyethers having at least 85% hydrogen groups present as amine compounds, polyether amines having at least 85% hydrogen groups present as amine compounds, and blends containing the aforementioned and wherein the isocyanate quasi prepolymer is formed from the reaction of a diisocyanate material with a suitable polyether based diamine and/or triamine wherein the degree of reaction between the ether-based amine and the diisocyanate material provides an excess of isocyanate equivalents in the quasi-prepolymer.

4. The vehicular exterior surface of claim 3 wherein the excess of isocyanate equivalent in the quasi prepolymer is between 12% to 16% defined by % of un-reacted isocyanate equivalent.

5. The vehicular exterior surface of claim 1 wherein the resin component includes at least one polymer and/or a blend of polymers present in an amount sufficient to impart a predetermined amount of tensile strength, hardness, and flexibility, and a second component composed of an isocyanate quasi-prepolymer based upon an aliphatic isocyanate and an amine terminated resin.

6. The vehicular exterior surface of claim 1 wherein the isocyanate quasi prepolymer component in the polymeric layer contains between 5-8% by weight alkylene carbonate selected from the group consisting of propylene carbonates, butylene carbonates, dimethylene carbonates and mixtures thereof.

7. The vehicular exterior surface of claim 6 wherein the isocyanate quasi prepolymer is an aliphatic isocyanate prepolymer that is prepared from the reaction of an aliphatic diisocyanate with at least one of polymeric polyamine, wherein the aliphatic diisocyanate is at least one of bifunctional monomers of the tetraalkyl xylene diisocyanate, trimerized monomers of aliphatic diisocyanate, biuret forms of aliphatic diisocyanate, cyclohexane diisocyanate, and isophorone diisocyanate; and wherein the polymeric polyamine has a molecular weight between 1000 and 5000 and includes at least one of a polymeric diamine and a polymeric triamine.

8. The vehicular exterior surface of claim 1 wherein resin component of the polymeric layer further comprises:
    at least one chain extender present in an amount sufficient to impart a predetermined amount of tensile strength, weatherability, flexibility, adhesion to specific substrates, and hardness,
    at least one filler present in an amount sufficient to impart a predetermined amount of hardness and flexibility.

9. The vehicular exterior surface of claim 1 wherein the aliphatic amine of the resin component includes at least one of amine-terminated polyethers, polyether amines, and polybutadiene terminated compounds, at least one material having a molecular weight above 2000.

10. The vehicular exterior surface of claim 9 wherein the amine terminated compounds are formed from base polyols selected from the group including polyoxypropylene diols, polyoxypropylene triols, polyester polyols, and multifunctional polyether polyols, the multi functional polyether polyols including di-functional polyether polyols, tri-functional polyether polyols and quad functional polyether polyols, the multifunctional polyester polyols including di-functional polyester polyols, tri-functional polyester polyols, and quad functional polyester polyols.

11. The vehicular exterior surface of claim 10 wherein the isocyanate component of the polymeric layer comprises isocyanate quasi-prepolymers formed from the reaction of a diisocyanate material with a suitable polyether based diamine and/or triamine, wherein the degree of reaction between the ether-based amine and the diisocyanate material provides an excess of isocyanate equivalents in the quasi-prepolymer.

12. The vehicular exterior surface of claim 10 wherein the isocyanate component of the polymeric layer further comprises at least one additive including at least one alkylene carbonates selected from the group consisting of ethylene carbonates, propylene carbonates, butylene carbonates, dimethyl carbonates, and mixtures thereof.

13. The vehicular exterior surface of claim 1 wherein the polymeric layer resin component comprises
    at least one polymer comprising amine-terminated polyoxypropylene diols of at least 1000 molecular weight; and
    at least one chain extender is selected from the group consisting of cycloaliphatic diamine including isophorone diamines, acrylonitrile-modified isophorone diamines, acetone modified isophorone diamines, substituted, secondary cycloaliphatic diamines and unsubstituted diamines.

14. The vehicular exterior surface of claim 1 wherein the substrate is composed of at least one of metal, carbon graphite composites, fiberglass, polycarbonates, ABS, and structural polymeric materials, wherein the metal includes steel and polymeric coated steel.

15. The automotive vehicle of claim 1 wherein the vehicular exterior surface is at least one of at least a portion of an exterior pickup box or at least a portion of a vehicular running board.

16. The automotive vehicle of claim 1, wherein the polymeric layer is applied to the structural substrate using a spray applicator.

17. The vehicular exterior surface of claim 7 wherein the amine terminated polyether compound is a 2000 weight polyoxylalkylene diamine and wherein the quasi prepolymer has a degree of reaction between 12% and 16% based on percentage of unreacted isocyanate equivalent.

18. A polymeric system for use as a vehicular coating for an exterior vehicular surface, the polymeric system comprising the reaction product of an aliphatic amine component and an isocyanate component forming an aliphatic polyurea system, the aliphatic polyurea having linkages formed by the reaction of a compound having active amine hydrogen groups with isocyanates in which at least 75% of the hydrogen groups are present as amine compounds.

19. The polymeric system of claim 18 wherein the aliphatic polyurea system is composed of an aliphatic isocyanate quasi-prepolymer of an aliphatic isocyanate monomer and an amine terminated polyether resin; and a resin blend component of a blend of amine terminated polyether resins.

20. The polymeric system of claim 19 wherein the resin blend comprises at least two amine components including aliphatic di- and tri-amines having a suitable molecular weight between about 1000 and about 5000.

21. The polymeric system of claim 19 wherein the exterior vehicular surface is at least one of a pickup truck bed or a running board.

* * * * *